Figure 7:
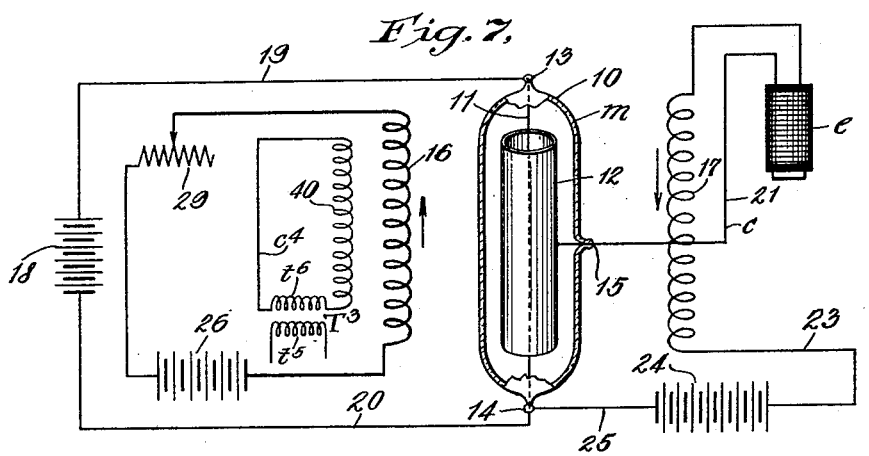

May 26, 1931.  T. BODDE  1,807,097
MAGNETRON CIRCUIT CONTROLLING APPARATUS
Filed July 11, 1923  3 Sheets-Sheet 1
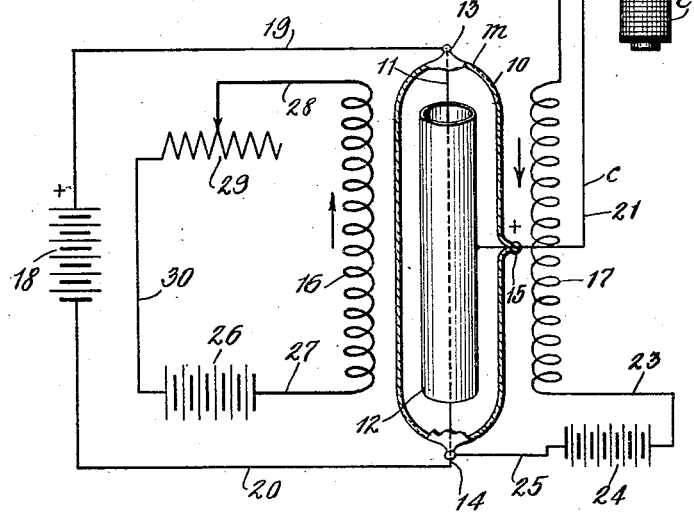
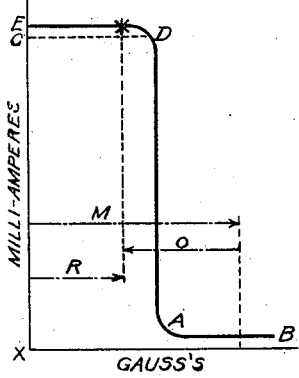
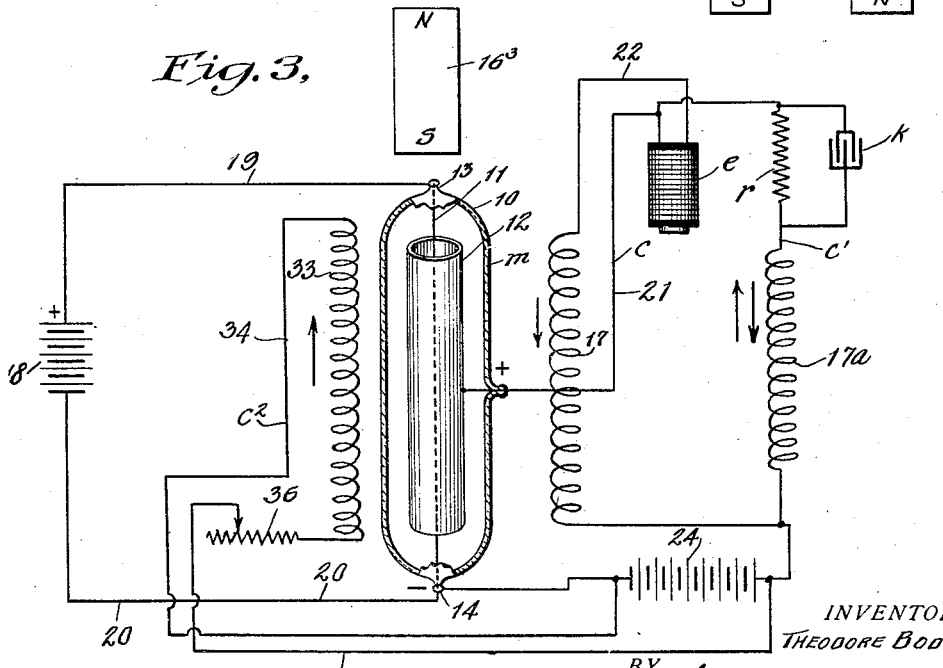
INVENTOR
THEODORE BODDE
BY Meyers & Cavanagh
ATTORNEYS May 26, 1931. T. BODDE 1,807,097
MAGNETRON CIRCUIT CONTROLLING APPARATUS
Filed July 11, 1923 3 Sheets-Sheet 2
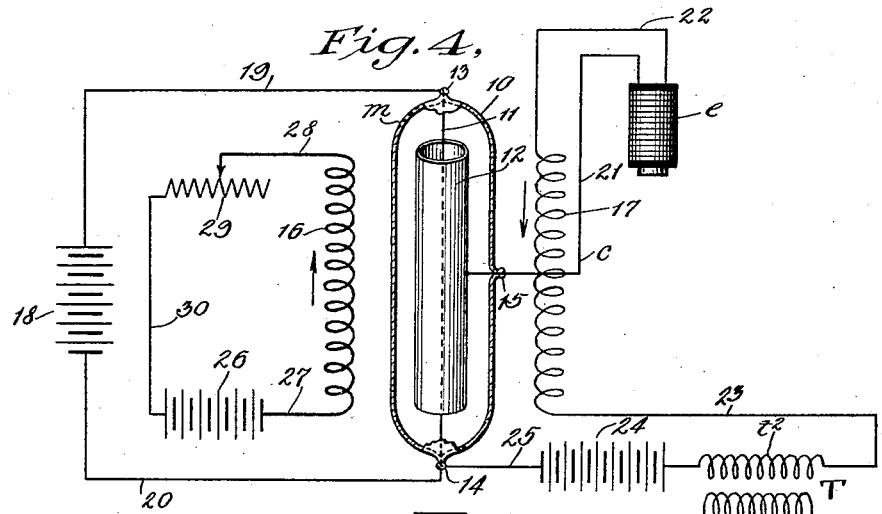
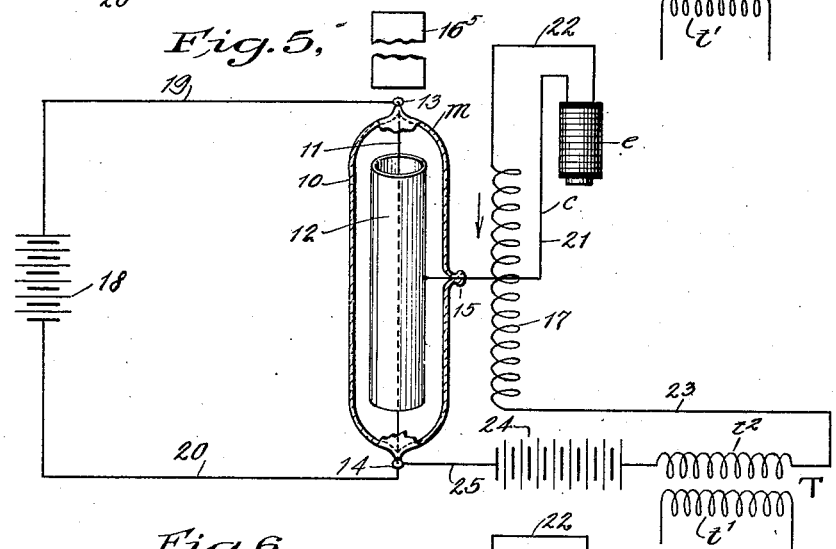
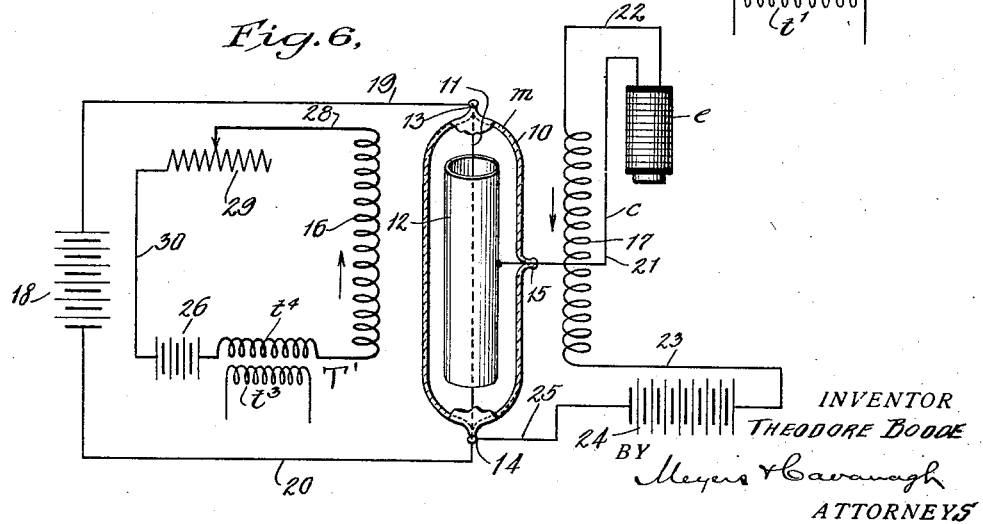
INVENTOR
THEODORE BODDE
BY Meyers & Cavanagh
ATTORNEYS May 26, 1931.    T. BODDE    1,807,097
MAGNETRON CIRCUIT CONTROLLING APPARATUS
Filed July 11, 1923    3 Sheets-Sheet 3

INVENTOR
THEODORE BODDE
BY
ATTORNEYS

Patented May 26, 1931

1,807,097

UNITED STATES PATENT OFFICE

THEODORE BODDE, OF NIAGARA FALLS, NEW YORK, ASSIGNOR TO THE REGAN SAFETY DEVICES COMPANY, INC., OF NEW YORK, N. Y., A CORPORATION OF NEW YORK

MAGNETRON CIRCUIT CONTROLLING APPARATUS

Application filed July 11, 1923. Serial No. 650,803.

This invention relates to a thermionic or electron discharge circuit controlling means, and relates more particularly to the provision of a magnetron controlled circuit controlling apparatus.

A prime desideratum of my present invention comprehends the provision of a magnetron controlled circuit controlling apparatus designed for producing persisting circuit changes in response to momentary electrical influences, such apparatus being serviceable for example in train control systems of the non-contact type as disclosed in my copending application Serial No. 566,565 for train control system, filed June 7, 1922, of which this application is a continuation in part.

In such train control systems, vehicle carried apparatus cooperates magnetically with roadside apparatus for producing train control indications in response to and in accordance with roadside or track conditions; and a desideratum in the operation of a system of this type centers about the production of vehicle carried apparatus which is instantaneous in its operation and which may be made immediately responsive to the roadside apparatus, especially when the vehicle carried apparatus passes or moves over the roadside apparatus at high speeds. The present invention is especially adapted for service in such train control systems, the desired sensitiveness being attained by the substantially inertialess characteristics both mechanically and electrically of the magnetron apparatus.

To the accomplishment of the foregoing and such other objects as may hereinafter appear, my invention consists in the elements and their relation one to the other, as hereinafter particularly described and sought to be defined in the claims, reference being had to the accompanying drawings, which show preferred embodiments of my invention, and in which:

Fig. 1 is a diagrammatic view of one embodiment of the magnetron circuit controlling apparatus of my invention, Fig. 2 is a graphical representation depicting characteristics of the apparatus and the underlying principles of the invention, Fig. 3 is a modified and improved form of the invention, and Figs. 4 to 9 inclusive are diagrammatic views showing other modifications.

Referring now more in detail to the drawings, and having particular reference to Fig. 1, the circuit controlling apparatus of my invention includes an electrically operated device such as an electromagnet $e$ arranged in a controlled circuit generally designated as $c$ connected to and controlled by the operation of an electron discharge device such as the magnetron $m$, the magnetron being controlled by monetary electrical influences for producing different conditions of operation in the magnetron $m$ and in the controlled circuit $c$, such as the sustained opening and closing of the magnetron and the persisting energization and deenergization of the circuit $c$.

The magnetron $m$ comprises a vacuous vessel or tube 10 provided with a cathode in the form of a straight filment 11, and with a cylindrical anode 12 encircling the cathode, the filament 11 being sealed at the terminals 13 and 14, the anode 12 being sealed at the terminal 15; and in the form of the invention illustrated in Fig. 1, the tube 10 is provided with means for creating controlling magnetic fields, the said means comprising the solenoids 16 and 17 arranged, as will be detailed hereinafter, in independent circuits, the said solenoids being provided for selectively controlling the activity of the electron discharge device. In the diagrammatic illustration of Fig. 1, the solenoids for purposes of clarity have been shown arranged at the sides of the tube 10, but it will be understood that the actual construction comprises a symmetrical arrangement of these solenoids encircling and surrounding the tube, the solenoids being coaxial with the anode and cathode of the tube.

For heating the filament or cathode 11 to obtain the desired emission of electrons, the terminals 13 and 14 of the cathode are connected to a glow circuit including the battery or other source of energy 18, the opposite poles of which are connected to the terminals 13 and 14 as by means of the conductors 19 and 20. As is well known, upon heating the filament 11 to incandescence by means of this glow circuit, there will take place an emission of electrons from the filament 11, which electrons will impinge upon the anode 12.

The electron flow between the anode and cathode controls the circuit $c$ heretofore mentioned, the said circuit including the electromagnet $e$ heretofore referred to, a conductor 21 connected to the anode terminal 15, conductor 22, the solenoid 17, conductor 23, a source of energy such as a battery 24, and a conductor 25 connected to the cathode terminal 14, the electromagnet $e$ being thus connected in series with the solenoid 17 across the cathode and anode terminals of the electron discharge device.

For energizing the solenoid 16 of the magnetron, there is provided the battery or other source of energy 26 connected to one terminal of the solenoid by the conductor 27, the other terminal of the solenoid being connected to the battery 26 by means of a conductor 28, a rheostat 29 and a conductor 30, the rheostat 29 being provided for obtaining the desired energization of the solenoid 16 to effect a predetermined magnetic influence upon the electron discharge device, as will become clearer hereinafter.

As is known, in the absence of any magnetic influence on the electron discharge device or magnetron $m$, the magnetron will be open and a current will flow through the controlled circuit $c$ for energizing the said circuit to effect the operation of the electrically operated device $e$. It is also known that when the magnetron $m$ is subjected to the influence of a magnetic field above a predetermined or critical magnitude, the electron flow between the cathode and anode will be interrupted for closing the magnetron and deenergizing the controlled circuit $c$. This phenomenon is graphically illustrated in Fig. 2 of the drawings, this figure representing the operating characteristics of the magnetron under the influence of a magnetic field, the strength of the magnetic field being represented by the abscissæ and the strength of the current in the output or controlled circuit $c$ by the ordinates, the curve EDAB depicting the characteristics of the magnetron and controlled circuit. If the strength of the magnetic field influencing the magnetron is less than the abscissa represented as CD, the electrons emitted from the cathode impinge uninterruptedly upon the anode and the current in the controlled circuit $c$ will be a maximum as represented by the ordinate XC. If, however, the strength of the magnetic field exceeds the critical point represented as D, the electrons will be diverted and prevented from reaching the anode 12 and the current in the output or controlled circuit $c$ will suddenly fall without lag or inertia to a value as represented by the part of the curve AB. From this it will be seen that the magnetron may be controlled by controlling in a predetermined manner the magnetic influence to which it is subjected.

For controlling the operation of the magnetron and the condition of the circuit $c$ in accordance with my invention, I provide means for producing opposed magnetic fields influencing the magnetron, the said opposed magnetic fields having a given resultant magnitude, which magnitude is selectively changed and re-established to produce different conditions of operation. To this end the solenoids 16 and 17 heretofore referred to are so wound and arranged on the magnetron tube 10 as to produce magnetic fields in opposition as indicated by the arrows in Fig. 1, the strength of the opposing magnetic fields being so predetermined that the magnetic field produced by the solenoid 16 when acting alone is effective for establishing one condition of operation, and the strength of the resultant of both magnetic fields acting in opposition is effective for producing a different condition of operation. These predetermined magnitudes are graphically illustrated in Fig. 2 of the drawings, the strength of the magnetic field due to the solenoid 16 being indicated by the arrowed line M, the value of this field being greater than the critical value of the curve EDAB, this magnetic field being therefore sufficient when acting alone to close the magnetron and deenergize the controlled circuit; and the strength of the opposing magnetic field produced by the solenoid 17 being indicated by the opposing arrowed line O, the interreaction of the fields M and O being such as to produce a resultant field indicated by the arrowed line R, this resultant being of a value less than the critical value of the curve and insufficient to disturb the open magnetron $m$ and the energized circuit $c$, the value of the current in the circuit being represented by the asterisk on the curve, Fig. 2.

As heretofore mentioned, for producing the different operations of the magnetron and controlled circuit, the resultant magnetic field is modified and re-established, the modification of the resultant field rendering the magnetron inactive and the re-establishing of the field effecting the re-establishing of the activity of the magnetron. These results may be accomplished in a number of ways, as will become clearer as the description proceeds, and in the construction exemplified in Fig. 1, I provide means for neutralizing the effect of the opposing magnetic field when the circuit $c$ is to be deenergized, and means for re-establishing this effect when re-energization of the circuit is desired, the said means comprising the spaced magnets 31 and 32, the magnetron being brought under the influence of the magnet 31 for deenergizing the circuit $c$ and under the influence of the magnet 32 for effecting the re-energization thereof. The apparatus shown in Fig. 1 is particularly designed as a train control system, the magnetron and its associated circuits being intended for employment as a vehicle carried apparatus, and the magnets 31 and 32 for employment as roadside apparatus arranged in spaced relation along the roadside, the magnetron being movable across the magnets successively in the movement of the train over the roadbed.

The magnet 31 has its poles arranged to oppose the opposing magnetic field of the solenoid 17 or to aid the main magnetic field of the solenoid 16, the influence of the magnet 31 being such that the effect of the opposing magnetic field O is neutralized so that the main field M alone is active for closing the magnetron and deenergizing the circuit $c$. It will be noted that although the influence of the magnet 31 is but momentary in the passage of the magnetron thereover, the deenergization of the circuit $c$ deenergizes the solenoid 17 and the opposing magnetic field O due to the solenoid 17 is therefore removed so that a sustained deenergization of the circuit $c$ is effected.

The magnet 32 is arranged with its poles reversed relatively to those of the magnet 31 so that the said magnet 32 is active to oppose the main magnetic field M of the solenoid 16, and thus when the magnetron moves over the magnet 32, the momentary influence of the magnet 32 is sufficient to produce a resultant field less than the critical value of the magnetron, this influence producing an opening of the magnetron and a re-energization of the circuit $c$. When the circuit $c$ is re-energized, it will be seen that the solenoid 17 therein is also energized, and thus the opposing magnetic field O of the solenoid 17 becomes effective to sustain the energization of the controlled circuit and cause the same to persist after the magnetron passes beyond the magnet 32.

From the foregoing, it will therefore be seen that under normal conditions the magnetron $m$ is open and the circuit $c$ energized with the magnetic fields M and O in opposition, the said circuit being maintained energized by the energization of the solenoid 17 therein, and that when the effect of the opposing magnetic field O is neutralized by a momentary magnetic impulse, the magnetron is closed and the circuit $c$ deenergized, and when the magnetron is influenced to produce an effect equivalent to the effect of the opposing magnetic field O, the magnetron is re-opened and the controlled circuit $c$ re-energized.

Referring now to Fig. 3 of the drawings, I show a modification of my invention in which the solenoid 16 is replaced by a permanent magnet $16^s$ which is preferably though not necessarily arranged coaxially with the magnetron tube 10, the remaining parts of the magnetron and its associated circuits being the same as that shown in Fig. 1. these similar parts being designated by similar reference characters. The apparatus shown in Fig. 3 also includes improvements for compensating for the change in voltage of the controlled circuit when the magnetron is opened or closed, and also for compensating for changes in the voltage controlling the magnetron which may take place during the normal operation of the same; and although such improvements are shown in conjunction with the apparatus of Fig. 3, I desire it to be understood that the same or equivalent improvements are equally applicable to the forms of my invention shown in the other figures, and are omitted therefrom to promote clarity of illustration.

I have found that although the magnetron circuit controlling apparatus is substantially mechanically inertialess that there exists an electrical inertia due to the ohmic resistance of the electromagnet $e$, and to the inductance of the same and the solenoid 17, which electrical inertia it is desired to overcome. When the circuit $c$ is suddenly deenergized, the voltage drop due to the ohmic resistance thereof suddenly diminishes, and the inductance thereof suddenly produces an E. M. F. in the same direction as the former current in the circuit, the sum total of these two causes producing a sudden rise in the voltage between the anode and cathode of the magnetron tube, which tends to maintain the high tension current in the circuit. This is due to the fact that the critical value CD of the magnetic field (Fig. 2) of a magnetron is directly proportional to the square root of the voltage between the cathode and anode. Hence when this voltage suddenly rises, the effect is as if the curve EDAB were shifted to the right of the position shown in Fig. 2, and the main magnetic field M is then insufficient to close the magnetron. Conversely when the magnetron is operated to open the same, the opening is opposed by a decrease in the voltage across the electrodes of the magnetron, the effect being as if the curve in Fig. 2 were shifted to the left and the resultant magnetic field R being then insufficient to re-establish activity of the magnetron. To neutralize or compensate for this electrical inertia of the controlled circuit, I provide means for compensating for this change in voltage produced when the magnetron is opened or closed, such means preferably comprising a shunt circuit generally designated as $c'$ connected in parallel with the electromagnet $e$ and the solenoid 17, the said shunt circuit comprising an inductor $17a$, the resistor $r$, and a condenser $k$, the inductance, resistance and capacitance, of these quantities being such as to produce a shunt circuit free from inductance. The inductance $17a$ is wound about the magnetron tube 10 in the same manner as the solenoid 17 so that the magnetic fields thereof are in the same direction. With this construction when the magnetron is closed the sudden voltage which is produced in the controlled circuit will produce a sudden reversal of current in the inductance 17a so that a field is obtained which aids the main magnetic field M. The quantities can be calculated so that this additional field is more than sufficient to compensate for the rise in voltage between the cathode and anode. When the opening of the magnetron takes place, there is obtained for the same reason a momentary increase of an opposing magnetic field in the inductance 17a sufficient to decrease the main field below the critical value necessary for opening the magnetron, with the result that the magnetron is opened without lag.

I have also found that slight voltage variations or fluctuations in the source of energy 24 which operates the magnetron or more generally that fluctuations in the voltage between the magnetron electrodes will disadvantageously affect the apparatus by accidentally opening or closing the magnetron. This also is due to the fact that the critical value of the magnetic field CD of the magnetron is dependent upon and is directly proportional to the square root of the voltage between the cathode and the anode; and thus when the voltage of the battery 24 decreases for example, the curve represented in Fig. 2 is in effect shifted to the left, and when shifted beyond the arrowed line R, the magnetron will accidentally close. To eliminate this tendency, I provide means for compensating for the changes in the voltage of the battery 24 that may take place during the normal operation of the magnetron, and to effect this I provide means for producing a corresponding variation in the main magnetic field M in such a way as to maintain always substantially the same relative proportion between the magnitude of the magnetic field M and the square root of the voltage of the battery 24; or regarded from another aspect, I provide means for maintaining substantially the same relative proportion between the main magnetic field M and the critical value of the magnetron.

The means I prefer to provide for effecting the desired compensation comprises a circuit generally designated as $c^2$ including a coil 33 which is wound about the magnetron tube 10 to produce a magnetic field having the direction indicated by the arrow in Fig. 3, aiding the magnetic field of the magnet $16^3$, the coil 33 and the magnet $16^3$ being combinedly employed for producing the main magnetic field M, the said circuit $c^2$ further including the conductor 34 connected to one pole of the battery 24 and the conductor 35 connecting the other pole of the battery 24 to the rheostat 36 which is connected in turn to the coil 33.

With this arrangement, it will be seen that the coil 33 is fed from the same source of energy that is connected to the electrodes of the magnetron, so that the magnetic field of the coil is at all times proportional to this voltage, the rheostat 36 being provided for regulating this electromagnetic field to the desired values. Thus a decrease in the voltage of the battery 24 which in effect shifts the curve to the left as viewed in Fig. 2 simultaneously decreases the value of the main field and the quantities may be so predetermined as to produce the same proportionate change in the magnitude of the main magnetic field and in the critical value of the magnetron at the changed voltage. I have found that to accomplish the desired result the best proportion between the permanent magnetic field of the magnet $16^3$ and the electromagnetic field of the coil 33 which together constitute the main field is that having a ratio of one.

Referring now to Fig. 4 of the drawings, I show another modification of my invention in which the means for operating the magnetron to produce the changes therein is incorporated in the magnetron circuits, a self-contained magnetron relay system being thereby produced. The parts of the magnetron apparatus are otherwise the same as that shown in Fig. 1, and similar parts are indicated by similar reference characters. The operating means in this system, however, comprises a source of electrical impulse such as a thermo-electric cell or transformer, the said transformer being indicated as T having a primary $t'$ and a secondary $t^2$, the secondary being included in the circuit $c$. In the operation of this system shown in Fig. 4 the magnetron is normally open and the circuit $c$ normally energized, closing of the magnetron and deenergization of the circuit being effected when a momentary impulse is produced in the secondary $t^2$ in opposition to the battery 24. This opposition in effect neutralizes the opposing magnetic field O of the solenoid 17, and the main magnetic field M becomes predominant in the action of the system to render the magnetron and the circuit $c$ inactive. When a reverse impulse is produced in the secondary $t^2$ aiding the voltage 24, the voltage of the circuit $c$ suddenly rises, increasing the critical value of the magnetron sufficiently to render the main magnetic field M insufficient for holding the magnetron inactive. The magnetron thereby opens, the circuit $c$ becomes re-energized, and the energization of the solenoid 17 maintains the magnetron and circuit in active condition.

In Fig. 5 I show a further modification of the invention, the apparatus shown in this figure differing from Fig. 4 by the substitution of the solenoid 16 and its circuit by a permanent magnet $16^5$. The remaining parts of the system are the same as that shown in Fig. 4, said parts being indicated by similar reference characters.

Referring now to Fig. 6 of the drawings, I show a still further modification, in which the source of electrical impulse is placed in the ciriuit producing the main field instead of in the circuit producing the opposing field, the transformer $T'$ having the primary $t^3$ and secondary $t^4$ being arranged in the circuit of the solenoid 16, the secondary $t^4$ being in series with said solenoid in said circuit. The remaining parts of the apparatus are the same as represented in Fig. 4 and are indicated by similar reference characters. In the operation of the system shown in Fig. 6 a momentary impulse produced in the secondary $t^4$ which aids the battery 26 will change the resultant R which influences the magnetron by increasing the main magnetic field M, the change effecting a closing of the magnetron and a deenergization of the circuit $c$. When, however, the impulse produced in the secondary $t^4$ is in opposition to the battery 26, the value of the main magnetic field M is decreased sufficiently to open the magnetron and re-energize the circuit $c$.

In the modification shown in Fig. 7 of the drawings, the means for producing the main and opposing fields shown in Fig. 1 are used, the means for operating the magnetron to produce the different conditions comprising an independent circuit $c^4$ provided with a solenoid 40 which is wound about the magnetron, the said solenoid being energized by means of a transformer $T^3$ having the primary $t^5$ and secondary $t^6$. The remaining parts of the apparatus are similar to that shown in Fig. 1, and these parts are designated by similar reference characters. The solenoid 40 and the transformer $T^3$ in this system are operated and produce the same results as the transformer $T'$ shown and described in connection with Fig. 6.

Figure 8:
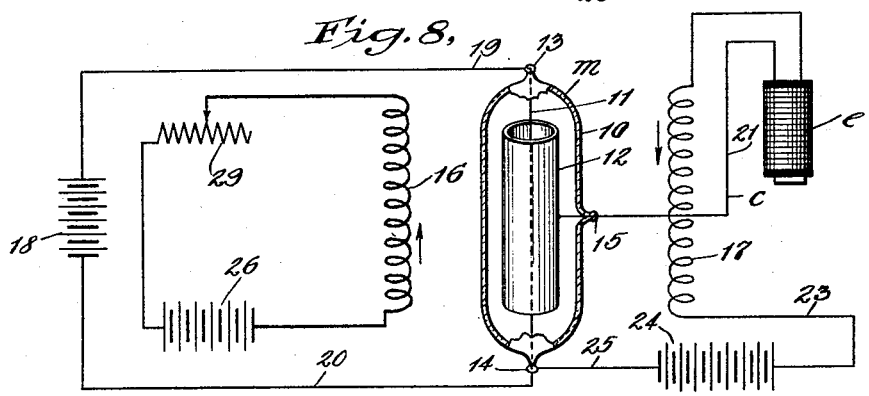

In Fig. 8 of the drawings, the operating means comprises an electromagnet 41 arranged preferably coaxially with the magnetron tube 10, the said electromagnet being energized by means of a transformer $T^4$ having the primary $t^7$ and secondary $t^2$, this electromagnet and operating means producing the same results as is produced by the circuit $c^4$ heretofore described in connection with Fig. 7, the remaining parts of the apparatus being similar to that shown in Fig. 7, such parts being indicated by similar reference characters.

Figure 9:
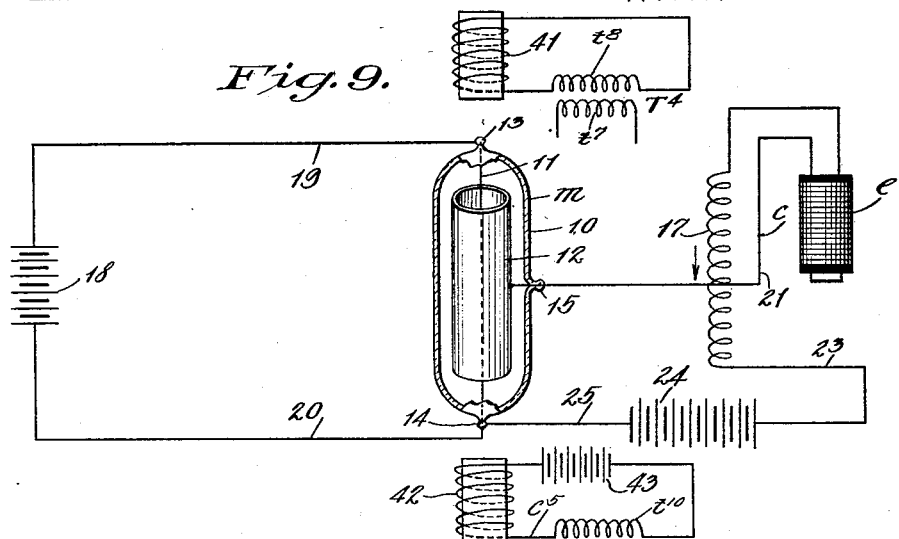

Referring now to Fig. 9 of the drawings, I show another modification in which the circuit producing the main magnetic field and the circuit provided with the electromagnet 41 shown in Fig. 8 are combined in a single circuit generally designated as $c^5$, the said circuit including an electromagnet 42, a battery 43, and the secondary $t^{10}$ of a transformer $T^5$ having a primary $t^9$. The remaining parts of the system are the same as that shown in Fig. 8, similar reference characters being applied to similar parts. The operation of this system shown in Fig. 9 is substantially the same as that shown in Fig. 6, the transformer circuit and the main magnetic field circuit being combined in both of these systems, that shown in Fig. 6 having the solenoid wound about the magnetron tube and that shown in Fig. 9 having the electromagnet arranged in axial alinement with the magnetron tube.

The operation of the various embodiments of the magnetron relay or magnetron circuit controlling apparatus will in the main be fully apparent from the above detailed description thereof. It will be further apparent that persisting circuit changes may be produced by momentary electrical influences affecting the magnetron, the changes being instantaneously effected by reason of the substantial absence of mechanical and electrical inertia in the system.

While I have shown my invention in the preferred forms, it will be obvious that many changes and modifications may be made in the structure disclosed without departing from the spirit of the invention, defined in the following claims.

I claim:

1. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means active for neutraliizng the effect of said opposing magnetic field so as to render the first mentioned magnetic field effective for producing the first mentioned condition.

2. In combination, an electron discharge device having a cathode and an anode, a circuit connected to the anode and cathode and controlled by the electron flow therebetween, means producing a magnetic field effective for influencing the said device to prevent the electron flow from impinging on the anode so as to deenergize the said circuit, means in said circuit for producing a magnetic field active in opposition to the first mentioned magnetic field for opposing the said influence of the same so as to maintain the circuit energized, and means for neutralizing the effect of said opposing magnetic field so as to render the first mentioned magnetic field effective for deenergizing the circuit and maintaining the same deenergized.

3. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means active momentarily for neutralizing the effect of said opposing magnetic field so as to render the first mentioned magnetic field effective for producing and maintaining the first mentioned condition.

4. In combination, an electron discharge device having a cathode and an anode, a circuit controlled thereby, means for producing opposed magnetic fields influencing said device and having a resultant magnitude such as to permit activity of the said device, and a magnetic field producing means for modifying the resultant of said fields for changing the operation of the said device.

5. In combination, an electron discharge device having a cathode and an anode, a circuit controlled thereby, means for producing opposed magnetic fields influencing said device and having a resultant magnitude such as to permit activity of the said device, and a magnetic field producing means active for modifying and reestablishing the resultant of said fields to render inactive and reestablish activity of the said device.

6. In combination, an electron discharge device having a cathode and an anode, means for producing opposed magnetic fields influencing said device and having a given resultant magnitude, and a magnetic field producing means for changing and re-establishing the said magnitude.

7. In combination, an electron discharge device having a cathode and an anode, means for producing opposed magnetic fields influencing said device and having a given resultant magnitude, and a magnetic field producing means for producing either of oppositely directed magnetic fields for changing and re-establishing the said magnitude.

8. In combination, an electron discharge device having a cathode and an anode, a circuit connected to the cathode and anode and controlled by the electron stream therebetween, means producing a magnetic field active on said device and effective for establishing a given condition therein and in said circuit, a solenoid in said circuit for producing a magnetic field active in opposition to said first mentioned magnetic field for establishing a different condition in said device and in said circuit, and means operative selectively for neutralizing the effect of said opposing magnetic field and for opposing said first mentioned magnetic field so as to selectively produce and maintain the said different conditions in said device.

9. In combination, a magnetron including an anode, a cathode and a means producing a magnetic field influencing the same and having a magnitude sufficient to close the magnetron, magnetic means for opposing the said magnetic field for opening the magnetron, and means for neutralizing the effect of said magnetic means.

10. In combination, a magnetron including an anode, a cathode and a means producing a magnetic field influencing the same and having a magnitude sufficient to close the magnetron, magnetic means for opposing the said magnetic field for opening the magnetron, and means operative for neutralizing the effect of said magnetic means and for producing an equivalent effect.

11. In combination, a magnetron including an anode, a cathode and a means producing a magnetic field influencing the same and having a magnitude sufficient to close the magnetron, a circuit controlled by the magnetron, means in said circuit active when the circuit is closed for opposing the said magnetic field for opening the magnetron, and mechanism for neutralizing the effect of said means to close the magnetron for opening the circuit and maintaining the same open.

12. In combination, a magnetron including an anode, a cathode and a means producing a magnetic field influencing the same and having a magnitude sufficient to close the magnetron, a circuit controlled by the magnetron, a solenoid in said circuit active when the circuit is closed for opposing the said magnetic field for opening the magnetron, and means for neutralizing the effect of said solenoid to close the magnetron for opening the circuit and maintaining the same open.

13. In combination, a magnetron including an anode, a cathode and a means producing a magnetic field influencing the same and having a magnitude sufficient to close the magnetron, a circuit controlled by the magnetron, means in said circuit active when the circuit is closed for opposing the said magnetic field for opening the magnetron and maintaining the same open, and mechanism operative selectively for neutralizing the effect of said means and for producing an equivalent effect to selectively close and open the magnetron for selectively producing a sustained opening and closing respectively of the circuit.

14. In combination, a magnetron including an anode, a cathode and a means producing a magnetic field influencing the same and having a magnitude sufficient to close the magnetron, a circuit controlled by the magnetron, means in said circuit active when the circuit is closed for opposing the said magnetic field for opening the magnetron and maintaining the same open, and mechanism operative selectively for momentarily neutralizing the effect of said means and for momentarily producing an equivalent effect to selectively close and open the magnetron for selectively producing a sustained opening and closing respectively of the circuit.

15. In combination, a magnetron including an anode, a cathode and a means producing a magnetic field influencing the same and having a magnitude sufficient to close the magnetron, a circuit controlled by the magnetron, a solenoid in said circuit active when the circuit is closed for opposing the said magnetic field for opening the magnetron and maintaining the same open, and mechanism operative selectively for neutralizing the effect of said solenoid and for producing an equivalent effect to selectively close and open the magnetron for selectively producing a sustained opening and closing respectively of the circuit.

16. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means for neutralizing the electrical inertia of the circuit.

17. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means for compensating for the change in voltage in the said circuit when the different condition is produced.

18. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, means active for neutralizing the effect of said opposing magnetic field so as to render the first mentioned magnetic field effective for producing the first mentioned condition, and means for compensating for the change in voltage in said circuit when one condition is changed into the other.

19. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, means active for neutralizing the effect of said opposing magnetic field so as to render the first mentioned magnetic field effective for producing the first mentioned condition, and means including a non-inductive circuit connected to said first mentioned circuit for compensating for the change in voltage in said first mentioned circuit when one condition is changed into the other.

20. In combination, an electron discharge device having a cathode and an anode, a circuit controlled thereby, means for producing opposed magnetic fields influencing said device and having a resultant magnitude such as to permit activity of the said device, means for modifying the resultant of said fields for changing the operation of the said device, and means for neutralizing the electrical inertia of said circuit incident to such change of operation.

21. In combination, an electron discharge device having a cathode and an anode, means for producing opposed magnetic fields influencing the device and having a given resultant magnitude, means for changing and re-establishing the magnitude, and means for neutralizing the electrical inertia of the device when the said magnitude is changed or re-established.

22. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means for compensating for variations in the voltage of said circuit while the device is operating under either of the said conditions.

23. In combination, an electron discharge device having a cathode and an anode, a circuit controlled thereby, means producing a magnetic field active on said device and effective for establishing a given condition therein and in said circuit, means in said circuit for producing a magnetic field active in opposition to said first mentioned magnetic field for establishing a different condition in said device and in said circuit, and means for maintaining substantially the same relative proportion between the magnitude of the first mentioned magnetic field and the square root of the voltage of the said circuit.

24. In combination, a magnetron including an anode, a cathode and a means producing a magnetic field influencing the same and having a magnitude sufficient to close the magnetron, a circuit connected to the anode and cathode and including a source of energy, magnetic means for opposing the said magnetic field for opening the magnetron, and means for maintaining substantially the same relative proportion between the said magnetic field and the square root of the voltage of said circuit.

25. In combination, an electron discharge device having a cathode and an anode, a circuit controlled thereby, said circuit including a source of energy, means producing a magnetic field active on said device, and means for maintaining substantially the same relative proportions between the said magnetic field and the square root of the voltage of said source of energy.

Signed at Niagara Falls, in the county of Niagara and State of New York, this 3d day of July, A. D. 1923.

THEODORE BODDE.